United States Patent
Yoon

(10) Patent No.: US 6,278,565 B1
(45) Date of Patent: Aug. 21, 2001

(54) DISK READ-OUT CIRCUIT EMPLOYING SEPARATE SERVO DATA AND INFORMATION DATA FILTERS

(75) Inventor: Jong-yoon Yoon, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 08/211,414

(22) PCT Filed: Nov. 30, 1992

(86) PCT No.: PCT/KR92/00068

§ 371 Date: Apr. 4, 1994

§ 102(e) Date: Apr. 4, 1994

(87) PCT Pub. No.: WO94/12977

PCT Pub. Date: Jun. 9, 1994

(51) Int. Cl.[7] ................................................. G11B 5/09
(52) U.S. Cl. ................................................. 360/46; 360/65
(58) Field of Search ................................. 360/46, 65, 67

(56) References Cited

U.S. PATENT DOCUMENTS

| 4,535,371 | * | 8/1985 | Harr et al. | 360/46 |
| 4,805,047 | * | 2/1989 | Nasu et al. | 360/65 |
| 4,894,734 | * | 1/1990 | Fischler et al. | 360/27 X |
| 5,196,970 | * | 3/1993 | Seko et al. | 360/65 |
| 5,327,302 | * | 7/1994 | Khoury et al. | 360/65 |
| 5,418,661 | * | 5/1995 | Nakamura | 360/65 |
| 5,422,760 | * | 6/1995 | Abbott et al. | 360/46 |

* cited by examiner

Primary Examiner—Alan T. Faber
(74) Attorney, Agent, or Firm—Sughrue, Mion, Zinn, Macpeak & Seas, PLLC

(57) ABSTRACT

A circuit for reading out data written on a disk filters respective frequencies of data of different bands. The circuit has a filter unit (24) consisting of a plurality of filters each corresponding to the frequency of a different band and a filter selection controller (25) for controlling the frequency supplied to the filter unit (24) to thereby filter with respect to the frequencies of different bands. Thus, high density data can be written on the disk, and filtering of the data is optimized, so that the signal quality of the disk read-out circuit is enhanced.

4 Claims, 3 Drawing Sheets

FIG. 4
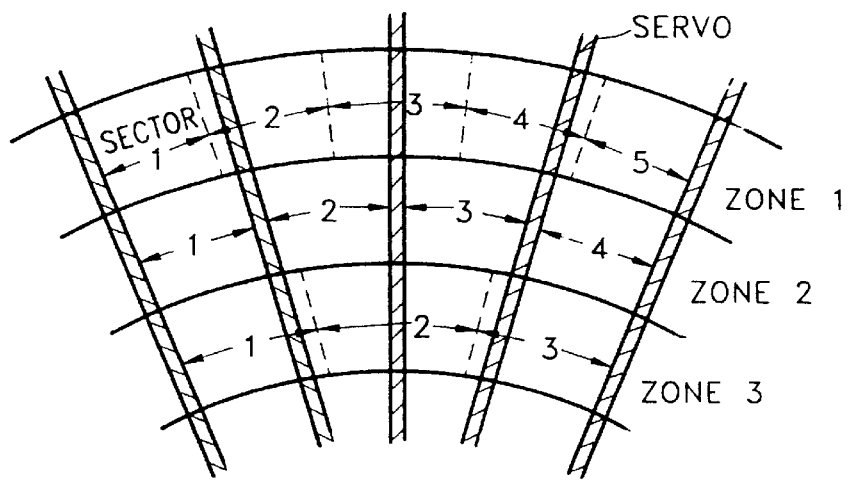
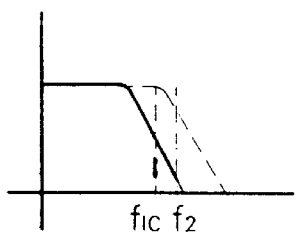
FIG. 5A
ZONE 1
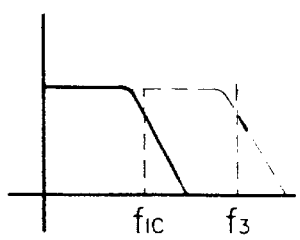
FIG. 5B
ZONE 2
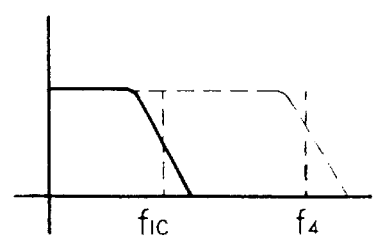
FIG. 5C
ZONE 3

DISK READ-OUT CIRCUIT EMPLOYING SEPARATE SERVO DATA AND INFORMATION DATA FILTERS

TECHNICAL FIELD

The present invention relates to a circuit for reading out data from a disc in a disc drive, and more particularly to a disc read-out circuit capable of filtering data in different bands of frequencies;

BACKGROUND ART

Magnetic disks are generally used for reading and writing data in connection with various equipment such as personal computers and word processors. However, owing to limited disk size, data written on the disk is often compressed, to increase the volume of data stored within a given area on the disk.

To meet this requirement, an apparatus which can read and write data having different periods onto one disk has been developed to increase the volume of data that can be stored on the disk. The apparatus which is disclosed in U.S. Pat. No. 4,805,047 entitled "Read/Write Magnetic Disk Apparatus Operable in Plural Density Modes," is a disk drive capable of reading and writing data while using plural density modes.

Referring to FIG. 1, the data read-out circuit in the disk drive of the above patent includes: a head 10 for reading out data stored on a disk 1; a gain controlled amplifier 11; a first filter 13 for filtering servo data in the data supplied from head 10 via gain-controlled amplifier 11; a second filter 14 for filtering information data in the data supplied from head 10 via gain-controlled amplifier 11; a signal controller 15 for recognizing the frequencies corresponding to the servo data and information data having different bandwidths from each other, and generating a signal for activating one filter corresponding to the recognized frequency; a differentiator 16 for differentiating the signal filtered in first and second filters 13 and 14; a differential comparator 17 for eliminating a distorted signal; and a pulse generator 18 for producing one-shot pulse from the servo and information data. Here, gain controlled amplifier 11 amplifies the servo and information data supplied from head 10, and then supplies the amplified data to first and second filters 13 and 14. At this time, one filter is selected to filter the data by generating a servo signal, so that signal controller 15 activates either first filter 13 when the signal supplied from head 10 corresponds to the servo data or second filter 14 when the signal from head 10 corresponds to the information data.

Meanwhile, the frequency bands employed in the servo and information data may be identical to each other, but the frequency band of the information data is generally higher, so that much more data can be written in this section. Currently, a zone bit recording mode is utilized to maximize the recording density of the information data, wherein the servo data has the same frequency throughout every zone on a disk; but the data on the region where the information data is recorded, is recorded and reproduced as frequencies having different bands for the respective zones.

Therefore, in the conventional disk drive, the greater difference between the frequency band corresponding to the data written in the servo and information data sections induces greatly different signal qualities of the servo and information data. As a result, the function of the filter is lowered which affects the quality of the disk drive.

SUMMARY OF THE INVENTION

In order to solve the above-described problem, the object of the present invention is to provide a disk read-out circuit including means capable of filtering respective frequencies of different bands, thereby providing a signal of high quality.

To achieve the object of the present invention, there is provided a circuit for reading out servo and information data from a disk having a plurality of tracks forming concentric circles partitioned into a plurality of sectors, each sector consisting of a first region recorded with the servo data of the same frequency and a second region to be recorded with information data of different frequencies, the data read-out circuit comprising:

pickup means for picking up the data written on the disk as an electrical signal;

first filter means for filtering a signal corresponding to the servo data only in the picked-up electrical signal;

second filter means consisting of a plurality of filters for filtering a signal corresponding to each frequency band of the information data in the picked-up electrical signal; and filter selection control means having signal control means for recognizing each frequency of the data of different bands to supply the recognized data to a corresponding filter, whereby a servo signal is generated to allow the first filter means to be active when the picked-up electrical signal corresponds to the servo data, and a corresponding filter in the second filter means to be active by recognizing each data frequency band corresponding to data having different bands when the electrical signal corresponds to the information data.

Also, there is provided a data read-out circuit for reading out servo and information data from a disk having a plurality of tracks forming concentric circles partitioned into a plurality of sectors, each sector consisting of a first region having servo data of the same frequency and a second region having information data of different frequencies, the data read-out circuit comprising:

pickup means for picking up the data written on the disk as an electrical signal;

first filter means for filtering a signal corresponding to the servo data in the picked-up electrical signal;

second filter means for filtering a signal corresponding to the information data in the picked-up electrical signal; and filter selection control means for generating a servo signal to allow the first filter means to be active when the picked-up electrical signal corresponds to the servo data, and the second filter means to be active when the electrical signal corresponds to the information data.

BRIEF DESCRIPTION OF THE DRAWINGS

The present invention can be further understood with reference to the following description in conjunction with the appended drawings, wherein like elements are denoted by the same reference numerals. In the drawings:

FIG. 4 illustrates the formation of individual data sectors recorded on a disk;

FIGS. 5A, 5B and 5C show the frequency bandwidth of data written in respective zones according to the zone bit recording mode.

DETAILED DESCRIPTION OF THE PREFERRED EMBODIMENT OF THE INVENTION

Figure 2:
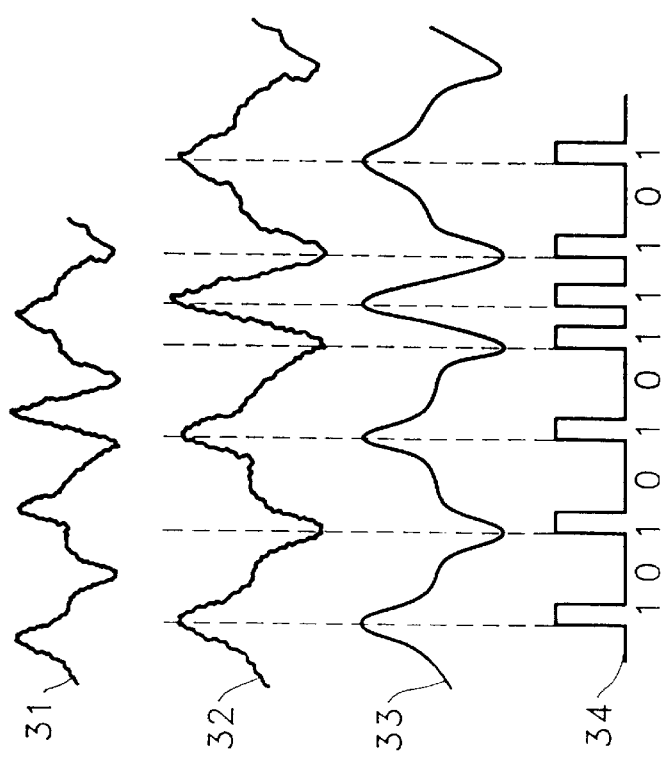
FIG. 2 illustrates the process for converting data written on the disk into a digital signal.

Referring to FIG. 2, a reference numeral 31 denotes a waveform of a signal supplied from a head; 32 is a waveform of a signal obtained by amplifying signal 31 supplied from the head; 33 is a waveform of a signal obtained by filtering the amplified signal 32; and 34 is a waveform of a signal obtained by digitizing the filtered signal 33. Here, a disk drive detects data such that it filters signal 31 supplied from the head to thereby eliminate distortion, and then converts the filtered signal into the digital data.

Figure 3:
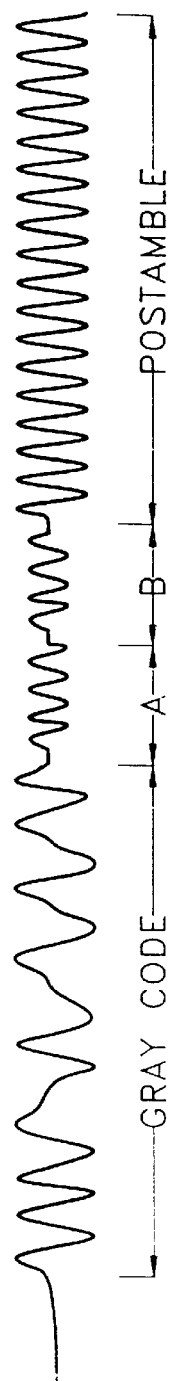
FIG. 3 illustrates the pattern of servo data.

As shown in FIG. 3, servo data written on a disk has position data (gray code) for indicating the inherent position of a track, data (A and B) for placing the head on the center of the track, and data (postamble) for synchronization, and is different from information data which is actually utilized by a user. The frequencies of each of the two types of data are different from each other. The servo data is written and read out by means of a circuit called a servo writer. Also, the section of the disk on which the servo data is written is distinct from the data section actually utilized by the user, i.e., the information data section.

Generally, in the zone bit recording mode, the disk tracks are divided into zones and sectors, with each sector being divided into two regions: a region for writing the servo data written during the manufacturing process and a region for writing information data. Here, the number of sectors is different for each zone. In more detail, referring to FIG. 4, the disk is partitioned into zones forming concentric circles around the center of the disk, and each zone consists of sectors. Also, each sector is divided into regions for writing servo data and information data. The circumference of each zone becomes shorter towards the center of the disk, reducing the number of sectors in zones nearer the center. Correspondingly, the number of sectors increases when moving outward from the center of the disk.

In view of the relation between frequency and time, since the read/write time of the data is the same in each zone, the read/write frequencies differ, in the data region of each zone.

Due to this reason, as shown in FIGS. 5A–5C, the frequency bandwidth of the data differs in each zone, and especially, the frequency in a zone 3 is extremely different from that of the corresponding servo data. Moreover, when a zone has more sectors, the frequency difference becomes more severe.

Figure 1:
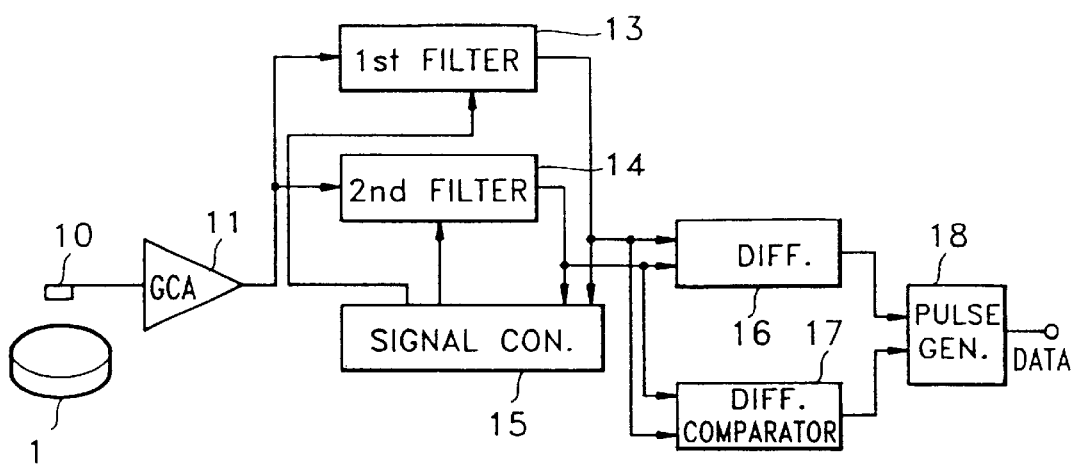
FIG. 1 is a block diagram showing a disk read-out circuit of the prior art.
Figure 6:
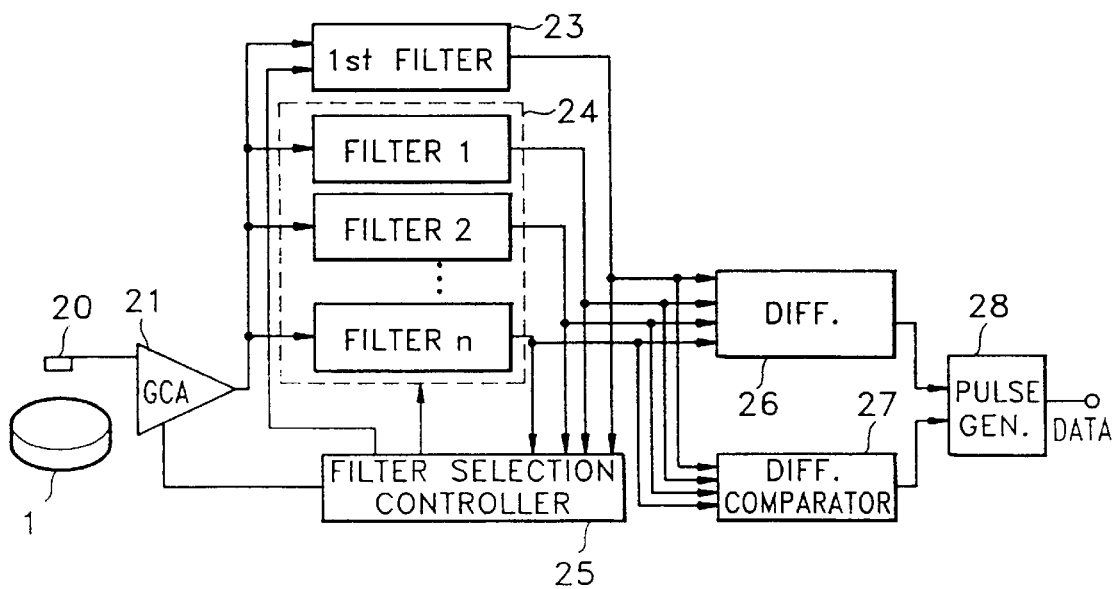
FIG. 6 is a block diagram of a disk read-out circuit according to the present invention.

In order to solve the foregoing problem, a disk drive according to the present invention shown in FIG. 6 comprises: a pickup 20 for picking up written data from a disk 1 as an electrical signal; a gain controlled amplifier 21 for gain-control-amplifying the data supplied from pickup 20; a first filter unit 23 for filtering a signal corresponding to servo data in the picked-up electrical signal; a second filter unit 24 consisting of a plurality of filters for filtering a signal corresponding to information data having respective frequencies of different band in the picked-up electrical signal; a filter selection controller 25 for recognizing each data frequency, and generating a servo signal for allowing one filter corresponding to the recognized frequency to be active; a differentiator 26 for differentiating the filtered signal in first and second filter units 23 and 24; a differential comparator 27 for eliminating distortion; and a pulse generator 28 for producing one-shot pulse from the data. Here, gain-controlled amplifier 21 supplies the electrical signal supplied by means of pickup 20 to filter selection controller 25. Also, filter selection controller 25 allows first filter unit 23 to be active when the picked-up electrical signal corresponds to the servo data. Meanwhile, when the electrical signal corresponds to information data, filter selection controller 25 recognizes each frequency and generates the servo signal for allowing one filter corresponding to the recognized frequency band to be active in second filter unit 24, thereby filtering the signal. Thereafter, the signal filtered in accordance with the above-described method is differentiated in differentiator 25 and then is output. The distortion in the differentiated signal is eliminated in differential comparator 26, so that a distortion-free coded data signal is produced, to be thus output via pulse generator 28.

That is, in the disc drive constructed as above according to the present invention, the filtering is carried out such that, if a control command is input or command to read out the servo data occurs, filter selection controller 25 selects one filter corresponding to the frequency of the servo data. Meanwhile, upon occurrence of a command to read out information data, a filter of the corresponding frequency band is selected.

As another embodiment of the disk drive according to the present invention, in place of second filter unit 24, a programmable filter capable of altering bands is employed. Otherwise, the filtering can also be carried out using passive devices, i.e., resistors, inductors and capacitors, to control the filtering of the frequency band of the corresponding data.

Therefore, the readout circuit in a disk drive according to the present invention allows data having different frequency bands to be read and written on the same track of a disk. Thus, the data can be stored at a high density. Also, the filtering is carried out with respect to respective frequencies corresponding to the data. As a result, the filtering of the signal is optimized and the signal quality of the disk drive is remarkably enhanced.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by persons skilled in the art without departing from the scope of the present invention as defined by the following claims.

As described above, the present invention is applied to a data filtering circuit for reading out data on a disk, capable of filtering respective frequencies of different bands in a disk drive, but is not necessarily limited thereto. Instead, it should be appreciated that the present invention can be applied to any disk read-out circuit in a disk drive.

What is claimed is:

1. A circuit for reading out data from a disk having a plurality of tracks forming concentric circles partitioned into a plurality of sectors, each sector consisting of a first region recorded with servo data of the same frequency and a second region recorded with information data of different frequencies, said circuit comprising:

pickup means (20) for picking up said data written on said disk and converting said data into an electrical signal;

an amplifier which receives the electrical signal and outputs an amplified electrical signal;

first filter means (23) for filtering signal frequencies corresponding only to the frequencies of said servo data in said picked-up electrical signal;

second filter means (24) including a plurality of filters for filtering signal frequencies corresponding to each frequency of said information data in said picked-up electrical signal; and filter selection control means (25) which receives said amplified electrical signal and determines, when said amplified electrical signal includes said information data, which of the different frequencies in which said information data included in said amplified electrical signal has been recorded, and for providing a servo signal to said first filter means to allow said first filter means (23) to be active when said picked-up electrical signal corresponds to said servo data and to allow a corresponding one of said filters in said second filter means (24) to be active according to which of the different frequencies is determined when said amplified electrical signal includes said information data.

2. A circuit for reading out data from a disk having a plurality of tracks forming concentric circles partitioned into a plurality of sectors, each sector consisting of a first region having servo data of the same frequency and a second region having information data of different frequencies, said data read-out circuit comprising:

pickup means (20) for picking up said data written on said disk as an electrical signal;

an amplifier which receives said electrical signal and outputs an amplified electrical signal;

first filter means (23) for filtering a signal corresponding to said servo data in the picked-up electrical signal;

second filter means (24) for filtering a signal corresponding to said information data in said picked-up electrical signal; and filter selection control means (25) which receives said amplified electrical signal and determines, when said amplified electrical signal includes said information data, which of the different frequencies of said information data is present in said amplified electrical signal, and for generating a servo signal to allow said first filter means to be active when said picked-up electrical signal corresponds to said servo data, and said second filter means (24) to be active when said amplified electrical signal includes said information data; and wherein said second filter means includes means for programming the band of said second filter means to a frequency band corresponding to the frequency band of said information data in said amplified electrical signal.

3. A circuit for reading out data from a disk having a plurality of tracks forming concentric circles partitioned into a plurality of sectors, each sector consisting of a first region recorded with servo data of the same frequency and a second region recorded with information data of different frequencies, said circuit comprising:

a pickup unit which picks up said data written on said disk and converts said data into an electrical signal;

an amplifier which receives the electrical signal and outputs an amplified electrical signal;

a first filter unit which filters signal frequencies corresponding only to the frequencies of said servo data in said picked-up electrical signal;

a second filter unit including a plurality of filters which filters signal frequencies corresponding to each frequency of said information data in said picked-up electrical signal; and a filter selection control unit which receives said amplified electrical signal and determines, when said amplified electrical signal includes said information data, which of the different frequencies in which said information data included in said amplified electrical signal has been recorded, and which provides a servo signal to said first filter unit to allow said first filter unit to be active when said picked-up electrical signal corresponds to said servo data and to allow a corresponding one of said filters in said second filter unit to be active according to which of the different frequencies is determined when said amplified electrical signal includes said information data.

4. A circuit for reading out data from a disk having a plurality of tracks forming concentric circles partitioned into a plurality of sectors, each sector consisting of a first region having servo data of the same frequency and a second region having information data of different frequencies, said data read-out circuit comprising:

a pickup unit which picks up said data written on said disk as an electrical signal;

an amplifier which receives said electrical signal and outputs an amplified electrical signal;

a first filter unit which filters a signal corresponding to said servo data in the picked-up electrical signal;

a second filter unit which filters a signal corresponding to said information data in said picked-up electrical signal; and a filter selection controller which receives said amplified electrical signal and determines, when said amplified electrical signal includes said information data, which of the different frequencies of said information data is present in said amplified electrical signal, and which generates a servo signal to allow said first filter unit to be active when said picked-up electrical signal corresponds to said servo data, and said second filter unit to be active when said amplified electrical signal includes said information data; and wherein said second filter unit includes a unit which programs the band of said second filter unit to a frequency band corresponding to the frequency band of said information data in said amplified electrical signal.

* * * * *